United States Patent [19]

Tejima et al.

[11] Patent Number: 4,949,115
[45] Date of Patent: * Aug. 14, 1990

[54] AUTOMATIC FOCUSING PROJECTOR

[75] Inventors: Yasuyuki Tejima; Akihiro Arai; Hideaki Yuda, all of Tokyo; Saburo Sugawara, Kawasaki; Shigeo Toji, Tokyo, all of Japan

[73] Assignee: Asahi Kogaku Kogyo K.K., Tokyo, Japan

[*] Notice: The portion of the term of this patent subsequent to Sep. 13, 2005 has been disclaimed.

[21] Appl. No.: 389,299

[22] Filed: Aug. 3, 1989

Related U.S. Application Data

[63] Continuation of Ser. No. 120,650, Nov. 16, 1987, Pat. No. 4,905,034, which is a continuation-in-part of Ser. No. 29,924, Mar. 25, 1987, Pat. No. 4,771,308.

[30] Foreign Application Priority Data

Nov. 17, 1986 [JP] Japan .................................. 61-176497

[51] Int. Cl.$^5$ .............................................. G03B 3/00
[52] U.S. Cl. .................................. 354/403; 250/201.4; 250/201.7
[58] Field of Search .................. 354/403, 415, 165; 356/1, 4; 250/201 AF, 552, 553, 237 R, 237 G, 496.1, 503.1, 368, 370, 393

[56] References Cited

U.S. PATENT DOCUMENTS

| 2,154,842 | 4/1939 | Glenn . | |
|---|---|---|---|
| 2,198,014 | 4/1940 | Ott . | |
| 3,088,023 | 4/1963 | Ayroldi . | |
| 3,682,071 | 8/1972 | Hosoe et al. | 354/403 |
| 3,784,836 | 1/1974 | Tolliver | 250/495 |
| 3,820,129 | 6/1974 | Hosoe | 354/403 |
| 3,836,919 | 9/1974 | Matsuomoto et al. | 354/403 |
| 3,959,660 | 5/1976 | Tolliver . | |
| 4,067,030 | 1/1978 | Kuramoto et al. | 354/165 X |
| 4,123,650 | 10/1978 | Hosoe | 354/403 |
| 4,150,888 | 4/1979 | Filipovich | 354/403 |
| 4,255,029 | 3/1981 | Freudenschuss | 354/403 |
| 4,274,735 | 6/1981 | Tamura et al. | 356/1 |
| 4,394,077 | 7/1983 | Yoshino et al. | 354/403 |
| 4,447,865 | 5/1984 | Van Horn et al. . | |
| 4,494,868 | 1/1985 | Lambeth | 354/403 X |
| 4,690,538 | 9/1987 | Matsui et al. | 354/403 |
| 4,710,638 | 12/1987 | Wood . | |
| 4,771,308 | 9/1988 | Tejima et al. | 354/403 |

FOREIGN PATENT DOCUMENTS

| 327025 | 10/1920 | Fed. Rep. of Germany . |
| 225183 | 7/1985 | Fed. Rep. of Germany . |
| 345692 | 10/1904 | France . |
| 57-148709 | 9/1982 | Japan . |

Primary Examiner—W. B. Perkey
Attorney, Agent, or Firm—Sandler, Greenblum & Greenblum

[57] ABSTRACT

An automatic focusing projector has a reflector which includes a semispherical mirror and a semielliptical mirror in combination, and a contrast chart having a contrast pattern associated with the reflector. The first focal point of the semielliptical mirror is identical to the center of the semispherical mirror. The contrast pattern is located between the first and second focal points of the semielliptical mirror. A light source is provided in the vicinity of the first focal point of the semielliptical mirror. The light source can be a white light source, and a colored filter can be positioned forwardly of a projecting lens which forms part of the projector in order to pass light having a wavelength region of low luminosity in which a human eye is virtually insensitive.

3 Claims, 5 Drawing Sheets

A

AUTOMATIC FOCUSING PROJECTOR

CONTINUING DATA

This application is a continuation application of U.S. patent application Ser. No. 07/120,650, filed on Nov. 16, 1987, now U.S. Pat. No. 4,905,034, which is itself a continuation-in-part of commonly-assigned U.S. patent application Ser. No. 029,924, filed on Mar. 25, 1987, now U.S. Pat. No. 4,771,308, the disclosure of which is expressly incorporated by reference herein.

BACKGROUND OF THE DISCLOSURE

1. Technical Field of the Invention

The present invention relates to an automatic focusing projector for giving an object a distance measuring contrast whenever the object has low illuminance or a small natural contrast. The present invention further relates to the use of a color filter in such a projector which is adapted to be used in combination with a white light source.

2. Description of Related Art.

Generally, automatic focusing projectors of the type disclosed by the present application are usually incorporated in automatic focusing cameras in which information representative of the distance of an object from the camera can be given by contrast in the object. Namely, when an object has a low illuminance or a small contrast, e.g., a white wall, insufficient contrast is obtained from such an object, and, accordingly, a contrast pattern must be projected onto the object to enable automatic focusing. Such a system is disclosed in commonly assigned U.S. patent application Ser. No. 029,924, of which the present application is a continuation-in-part.

FIG. 5, which is labelled prior art, illustrates the principle of such an automatic focusing projector, which is per se known. In such a projector, rays of light emitted from a light source 11 are transmitted, via a chart 12 which has a predetermined contrast pattern, e.g., alternating light and dark fringes, and are then projected onto an object 14 through a projecting lens 13 to provide a contrast on the object being photographed.

FIG. 4, also labelled as prior art, illustrates a known projector which is used in the optical system illustrated in FIG. 5. This known projector includes an elliptical mirror 15 which has a lamp (i.e., a light source) 16 located at a first focal point F1 of the elliptical mirror 15 and an exit opening 17 through which rays of light can be emitted. Opening 17 is located at an end of the elliptical mirror 15 which is close to a second focal point F2 thereof. Contrast chart 12 is positioned in front of opening 17, outside (and forwardly) of elliptical mirror 15. A projecting lens 13 is positioned forwardly of contrast chart 12 (having a patterned surface).

In this type of known projector, light from light source (i.e., lamp) 16 passes through second focal point F2, either directly or after reflection by the inner surface of mirror 15, and the light is then projected outwardly from elliptical mirror 15 through opening 17, so that the contrast pattern of contrast chart 12 is projected onto the object through projecting lens 13.

However, in the known projector illustrated in FIG. 4, almost all of the inner surface of the elliptical mirror must be used in order to project the contrast pattern on the object, necessarily resulting in an increased size for the whole optical system. In addition to this, since rays of light in the cross-hatched areas S shown in FIG. 4 cannot be utilized, the efficiency of light use is decreased. It is thus necessary to increase the size of projecting lens 13 in order to use all of the rays of light.

SUMMARY OF THE INVENTION

A primary object of the present invention is, therefore, to eliminate the aforementioned disadvantages by providing an automatic focusing projector which is highly efficient in its use of light.

Another object of the present invention is to provide a small projector which has a combined elliptical mirror and spherical mirror assembly, and which has an improved arrangement for its contrast chart. To achieve the above-mentioned objects, an automatic focusing projector according to the present invention is provided with a reflector having both an elliptical mirror and a semispherical mirror in combination, and with a contrast chart which is properly arranged in combination with the reflector. According to the present invention, a mirror having a light source therein comprises a front semispherical mirror which has an exit opening for light and a rear semielliptical mirror which has a first focal point located at a central point of the semispherical mirror. The light source (lamp) is located in the vicinity of the first focal point of the semielliptical mirror. The contrast pattern is located between the first and second focal points of the semielliptical mirror. In an additional embodiment, a color filter is provided in order to selectively pass light having a wavelength region of low luminosity to which the human eye is virtually insensitive. This becomes necessary when a white light source is used in the apparatus in order to achieve satisfactory long distance projection of light.

In one aspect, the present invention provides an automatic focusing projector having a light source, a contrast chart having a predetermined contrast pattern, a reflector which reflects rays of light from the light source towards the contrast chart, and a projecting lens which projects the light which is transmitted through the contrast chart onto an object, the reflector comprising a front semispherical mirror having an exit opening for light, and a rear semielliptical mirror having a first focal point which is located at a center of the semispherical mirror, the light source being located in the vicinity of the first focal point of the semielliptical mirror, the contrast chart being located between the first focal point and a second focal point of the semielliptical mirror, the projecting lens being located in front of the second focal point of the semielliptical mirror.

The contrast chart has a predetermined fringe pattern and can be secured within the exit opening of the semispherical mirror.

The semielliptical mirror is connected to the semispherical mirror along a line defined by an interior edge of a rear portion of the semispherical mirror, and the first focal point, the line being perpendicular to an optical axis of the projector. The semielliptical mirror has a largest diameter portion which is smaller than the largest diameter portion of the semispherical mirror.

The contrast chart is positioned forwardly of the exit opening of the semispherical mirror; and the semispherical mirror forms part of a semispherical mirror assembly having a forwardly directed attachment portion, the attachment portion including a bore extending forwardly from the exit opening of the semispherical mirror, the contrast chart being positioned adjacent one end of the bore.

The contrast chart is inclined with respect to the optical axis of the projector; and the projector comprises part of a stroboscope which is detachably detached to a hot shoe of a camera body. Alternately, the projector is attached to a camera body. A body filter can be positioned forwardly of the taking lens.

In a second aspect, in the present invention, an automatic focusing projector is provided having a light source, a contrast chart having a predetermined contrast pattern, a reflector which reflects rays of light from the light source towards the contrast chart, and a projecting lens which projects the light which is transmitted through the contrast chart onto an object. The light source is located in the vicinity of the first focal point of the reflector, the contrast chart being positioned forwardly of the focal point, the projecting lens being located forwardly of the contrast chart, and a color filter positioned forwardly of the projecting lens. The light source is a white light source, and the contrast chart can be inclined with respect to the optical axis of the projector.

In another aspect, the invention provides an automatic focusing projector having a light source, a contrast chart having a predetermined contrast pattern, and a reflector which has an exit opening and which reflects rays of light from the light source towards the contrast chart. The contrast chart is angled with respect to an axis of the projector and is positioned near the opening. A projecting lens, for projecting light transmitted through the contrast chart onto an object, the lens being positioned forwardly of the chart. A color filter is positioned forwardly of the projecting lens, the filter comprising means for selectively passing light having a wavelength region of low luminosity.

The color filter comprises means for selectively passing light of a wavelength region of low luminosity at which a human eye is virtually insensitive.

BRIEF DESCRIPTION OF THE DRAWINGS

The above and other objects, features and advantages of the present invention will be described below in greater detail with respect to the accompanying drawings, in which like reference numerals are used to identify similar parts throughout the several views, and wherein.

DESCRIPTION OF PREFERRED EMBODIMENTS

The present invention will now be described in further detail below with specific reference to the various drawings illustrating different embodiments of the invention.

Figure 1:
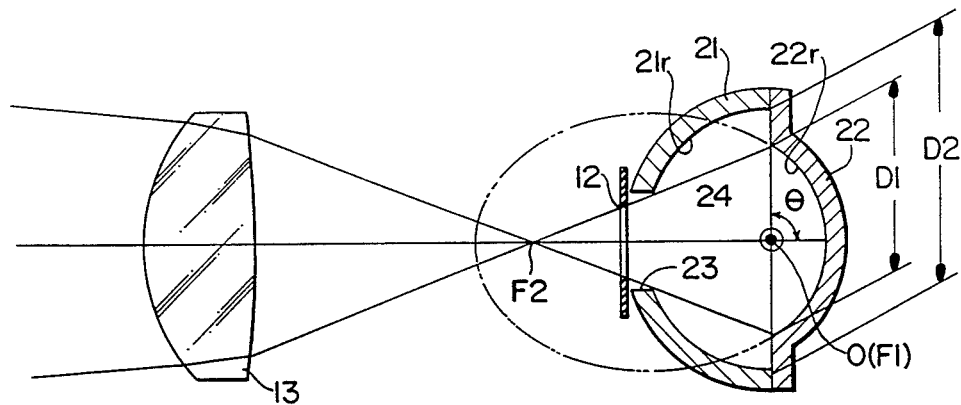
FIG. 1 is a longitudinal sectional view of an automatic focusing projector formed according to one aspect of the present invention.

As illustrated in FIG. 1, the projector of the present invention has a reflector which has a front semispherical mirror 21 and a rear semielliptical mirror 22 in combination with mirror 21. The semispherical mirror 21 has an exit opening 23 located at the center of the front portion of the mirror. The center O of the semispherical mirror 21 is located at the first focal point F1 of the semielliptical mirror 22. The semispherical mirror 21 has a semispherical reflecting surface 21r which is located in front of the center O, and the semielliptical mirror 22 has an elliptical reflecting surface 22r which is located rearwardly of a line passing through the first focal point F1 and normal to the optical axis of the projector.

The second focal point F2 of the semielliptical mirror 22 is located in front of (and outside) the semispherical mirror 21. The largest diameter D1 of the semielliptical mirror 22 is smaller than the largest diameter D2 of the semispherical mirror 21.

At the connection between the semispherical mirror 21 and the semielliptical mirror 22, a line connecting an edge E of the mirror portion of semielliptical mirror 22 and the first focal point F1 intersects the optical axis at an angle $\theta$, preferably at a right angle (i.e., at a 90° angle). If the angle $\theta$ is smaller than 90°, a portion of the rays of light will be repeatedly reflected within the semispherical mirror 21, so that they cannot be emitted outwardly from exit opening 23, resulting in decreased efficiency in the use of light.

To the contrary, if the angle $\theta$ is larger than 90°, the light which is reflected by the portion of semielliptical mirror 22 beyond 90° will be intercepted by semispherical mirror 21. In order to prevent such interception, it will be necessary to make exit opening 23 larger. Accordingly, when the angle $\theta$ is 90°, the most effective use of light can be expected, using a small exit opening 23.

Lamp 24 is located at the center O of the semispherical mirror 21, and, accordingly, at the first focal point F1 of semielliptical mirror 22. Contrast chart 12 is positioned in front of lamp 24 and between the first and second focal points F1 and F2 of semielliptical mirror 22. Preferably, contrast chart 12 is located in the vicinity of exit opening 23. This arrangement of the contrast chart makes it possible to use a small contrast chart in order to project an enlarged contrast pattern on an object. Projecting lens 13 is located in front of second focal point F2.

With such an arrangement, the rays of light that are directed to elliptical reflecting surface 22r are reflected therefrom so as to pass through second focal point F2. The rays of light that are directed to the semispherical reflecting surface 21r are reflected thereby and pass through the first focal point F1 of semielliptical mirror 22, and, accordingly, the center O of the semispherical mirror 21. Therefore, the rays of light that are directed to the semispherical reflecting surface 21r pass through the second focal point F2, similar to the rays of light that are directed to elliptical reflecting surface 22r.

Since contrast chart 12 is located between the first and second focal points F1 and F2, all of the rays of light which are oriented to the second focal point F2 pass through contrast chart 12. As a result, the rays of light which are projected from exit opening 23 can be certainly and effectively transmitted through the contrast chart 12 and projecting lens 13, resulting in an increased efficiency of light use. Furthermore, contrast chart 12 and projecting lens 13 can be reduced in diameter.

It should therefore be appreciated that a reflector having a semispherical mirror 21 and a semielliptical mirror 22 in combination, according to the present invention, has a decreased in length along the optical axis direction, as compared to a conventional reflector which has only an elliptical mirror and is without a semispherical mirror. This combination results in a small projector which can achieve the objects of the present invention.

It is not necessary to strictly control the position of lamp 24 with great precision. Namely, if a deviation F1' in the position of the lamp occurs in the vicinity of the first focal point of F1, a deviation of light F2' will also occur for second focal point F2. That is, the rays of light will not converge upon the second focal point F2. The deviated light is reflected by semispherical reflecting surface 21r and passes a point F1'', which is symmetrical to deviated lamp 24 with respect to first focal point F1. Since deviation F1'' occurs in a direction opposite to the deviation of light which is reflected only by elliptical reflecting surface 22r, light corresponding to a mean value of the deviations in opposite directions passes through second focal point F2. Accordingly, adjustment of the position of lamp 24 can be rough and can be easily effected.

Figure 2:
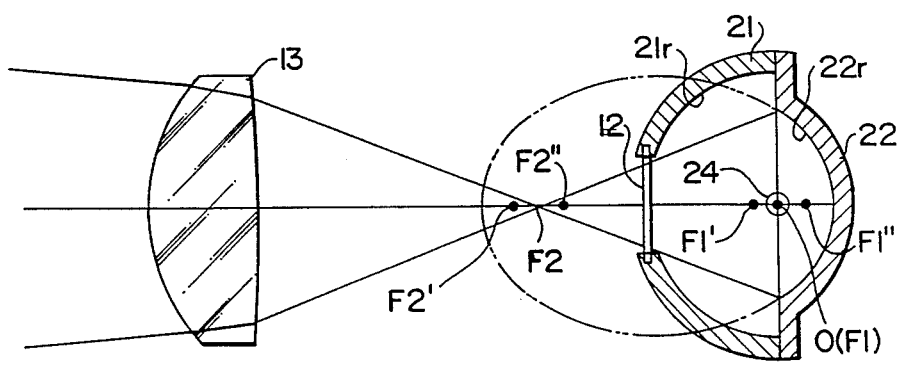
FIG. 2 is a longitudinal sectional view of an automatic focusing projector formed in accordance with a second aspect of the present invention.

FIG. 2 illustrates a second embodiment of the present invention. In this modified embodiment, contrast chart 12 is provided and secured within exit opening 23 of semispherical mirror 21. The other features of this construction are identical to those in the first embodiment illustrated in FIG. 1.

In this arrangement of the second embodiment, semispherical mirror 21, semielliptical mirror 22, and contrast chart 12 can be integrally formed in a single unit, resulting in easy assembly of the projector. In addition to such easy assembly, contrast chart 12 can have a decreased diameter in comparison with the diameter of the contrast chart of the first embodiment.

The automatic focusing projector of the present invention, which can measure the distance of an object by projecting rays of light, can be used with a stroboscope, so that the projector will project rays of light prior to the emmission of light by the stroboscope to make it possible to take a photograph in the dark. Alternately, it is also possible to incorporate the projector of the present invention in a camera body 33, as indicated by the dotted lines in FIG. 3, including a projector in combination with a stroboscope as noted above. Further, the projector of the present invention can be used as a socalled detachable type of projector which can be detachably connected to a hot (i.e., accessory) shoe of a camera body.

Figure 3:
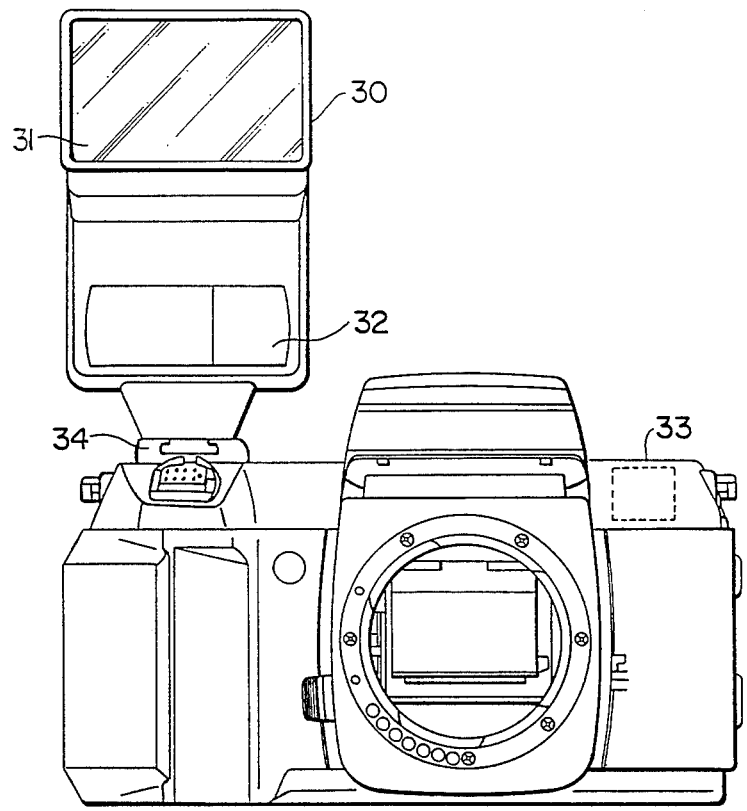
FIG. 3 is a front elevational view of a stroboscope in which a projector of the present invention is incorporated, the stroboscope being detachably connected to a camera.
Figure 4:
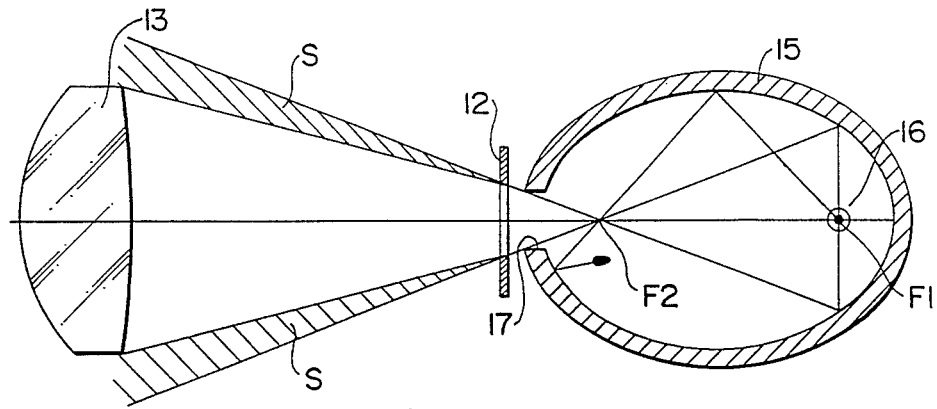
FIG. 4 is a longitudinal sectional view of a known automatic focusing projector.
Figure 5:
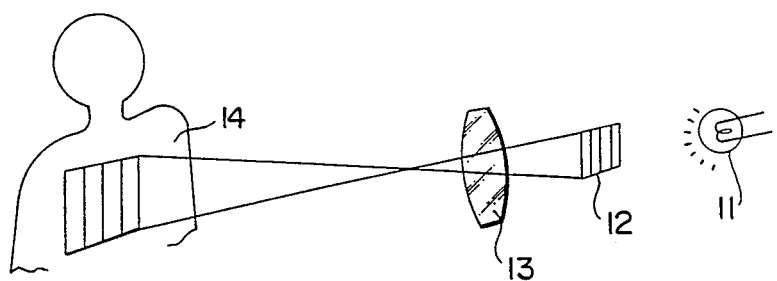
FIG. 5 is a schematic view illustrating the operation of an automatic focusing projector.

FIG. 3 illustrates another embodiment of the present invention, in which the projector is attached to a detachable stroboscope 30.

Stroboscope 30 includes a stroboemitter 31, which is per se known; and the projector 32 of the present invention, which is also generally known. Stroboscope 30 is detachably mounted to a hot shoe 34 of an automatic focusing camera body 33. Camera body 33 includes a stroboswitch (not shown) which operates in association with a shutter release button 35 provided on camera body 33, so that the stroboemitter 31 and projector 32 will emit rays of light in accordance with a predetermined operational sequence of camera body 33.

One example of such a sequence is noted as follows.

When shutter release button 35 is pushed downwardly by one step, an object distance measuring switch (not shown) operates and automatic focusing begins. When it is detected that the light of the object is below a predetermined reference value, or that the contrast of the object is insufficient, projector 32 emits rays of light. Stroboemitter 31 emits rays of light in response to the operation of the shutter release button, provided that the stroboemitter is fully electrically charged.

It is possible to actuate only projector 32 of the present invention without actuating stroboemitter 31.

Figure 6:
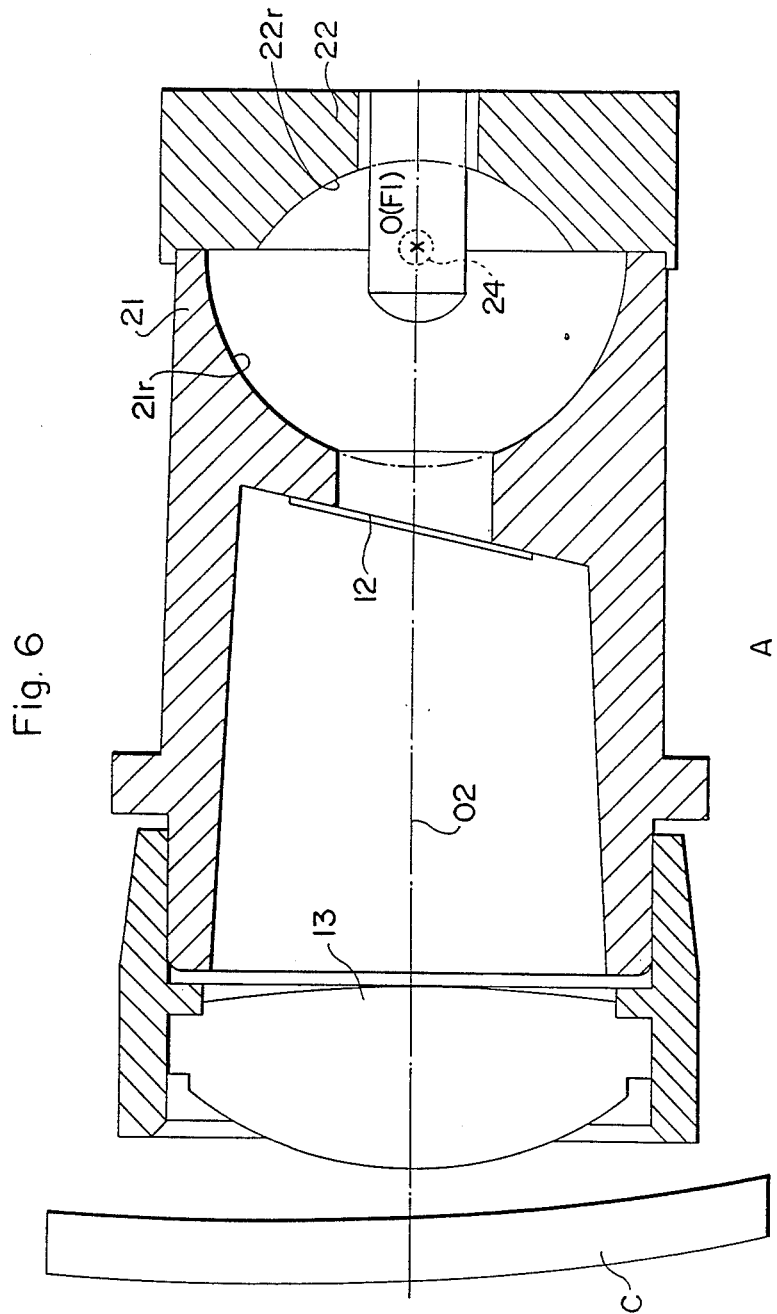
FIG. 6 is an enlarged sectional view of an automatic focusing projector according to another aspect of the present invention, which includes a color filter.

FIG. 6 illustrates another embodiment of the projector which is illustrated in FIGS. 1–5. Specifically, FIG. 6 illustrates a similar arrangement of a semispherical mirror 21 and a semielliptical mirror 22 having respective reflecting surfaces 21r and 22r. Lamp 24 is located essentially at the first focal point F1 of the semielliptical mirror 22. In this embodiment of the projector, the patterned surface or contrast chart 12 is positioned forwardly of the exit opening of the semispherical mirror, as in FIG. 1, but is positioned at an angle for all of the reasons discussed in U.S. patent application Ser. No. 029,924. Briefly, the contrast chart 12 is provided with an irregularly patterned surface (as shown in FIG. 9 of the parent application) such that light from the lamp 24 will pass through the angled patterned surface and so that an inclined image plane will be formed. Projection lens 13 is positioned forwardly of the contrast chart 12, and a color filter C is positioned forwardly of the projecting lens. The color filter is provided in order to selectively pass light which is in the wavelength region of low luminosity where the human eye is practically insensitive. In other words, for example, the color filter will serve only to pass red light from the light source. This is necessary if light source 24 is a white light source which is used in the projector in order to obtain long distance projection of light.

In the parent application, at page 13, it was indicated that red light was desirable. In such an instance, when an LED generating red light is used as a light source, the color filter need not be provided. However, in such a situation, as in the present application, it may not be possible to obtain adequate long distance projection of light reflected from the projector. As a result, the color filter is needed in order to achieve the dual objectives of satisfactory light projection and the utilization of red light in a wavelength region in which the human eye is practically insensitive.

Figure 7:
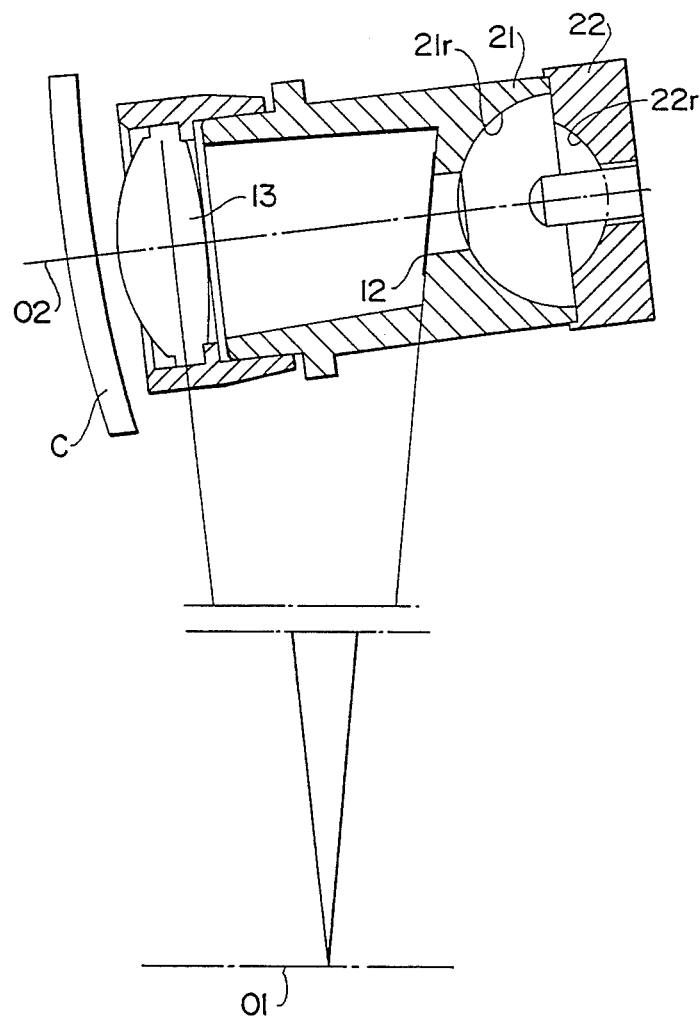
FIG. 7 is a sectional view of the apparatus of FIG. 6 in a second, angled position.
Figure 1:
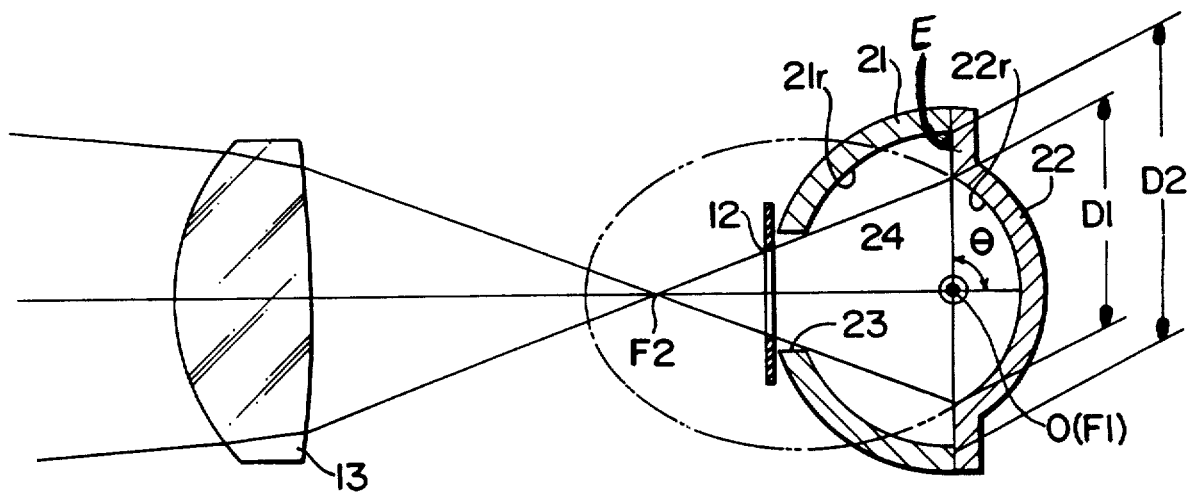
Figure 2:
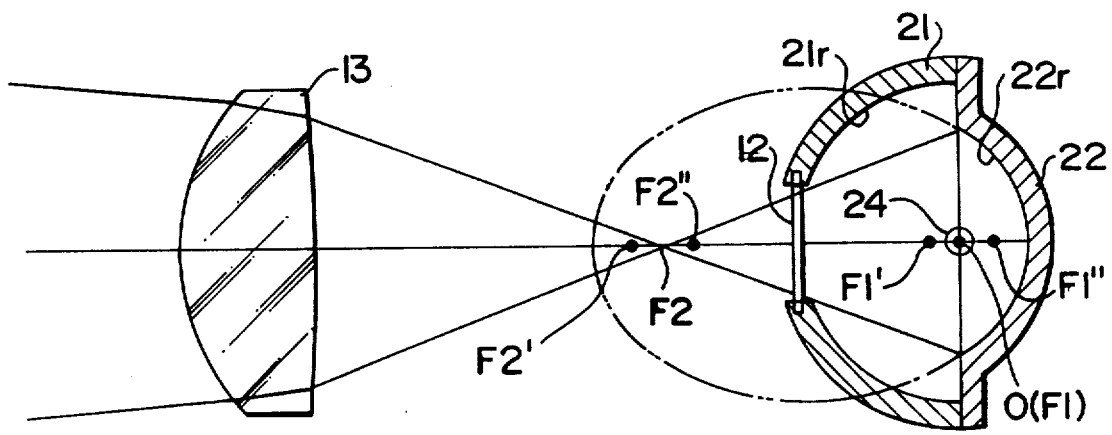

FIG. 7 illustrates the projector of FIG. 6 and its relationship to the optical axis O 1 of the imaging lens.

As can clearly be understood by the above discussion, and in accordance with the present invention, a small and compact automatic focusing projector having a high efficiency of light utilization can be achieved.

Further, in accordance with the present invention, a chart having a contrast pattern and a projecting lens can be reduced in diameter, therefore resulting in a reduced size, useful and reliable automatic focusing projector.

It should be clear to those of ordinary skill in the art that modifications and changes can be made to the projector of the invention and still be within the scope of the present invention.

What is claimed is:

1. An automatic focusing projector having a light source, a contrast chart having a predetermined contrast pattern, a reflector which reflects rays of light from said light source towards said contrast chart, and a projecting lens which projects the light which is transmitted through said contrast chart onto an object, said light source being located in the vicinity of a focal point of said reflector, said contrast chart being positioned forwardly of said focal point, said projecting lens being located fowardly of said contrast chart, a color filter positioned forwardly of said projection lens, said contrast chart being inclined with respect to a plane passing through an optical axis of said projector at right angles, said apparatus comprising means for projecting said contrast chart pattern so that said pattern extends at least in a direction positioned along an optical axis of an imaging lens associated with said projector.

2. An automatic focusing projector in accordance with claim 1, wherein said light source is a white light source.

3. A projector in accordance with claim 1, wherein said color filter comprises means for selectively passing light in a wavelength region of low luminosity at which a human eye is virtually insensitive.

* * * * *

UNITED STATES PATENT AND TRADEMARK OFFICE
CERTIFICATE OF CORRECTION

PATENT NO. : 4,949,115

DATED : August 14, 1989

INVENTOR(S) : Y. TEJIMA et al.

It is certified that error appears in the above-identified patent and that said Letters Patent is hereby corrected as shown below:

On the first page of the printed patent, in item 30, add the following Foreign Priority Data:
   ---March 25, 1986 (JP) Japan...61-66,967
   February 6, 1987 (JP) Japan...62-26,124---.
On the title page, under "Attorney, Agent or Firm", change "Sandler, Greenblum & Greenblum" to ---Sandler, Greenblum & Bernstein---.
At column 1, line 53, of the printed patent, change "forWardly" to ---forwardly---.
At column 5, line 12, of the printed patent, delete "in".
At column 6, line 2, of the printed patent, change "35" to ---(not shown)---.
At column 6, line 7 of the printed patent, change "shutter release button 35" to ---the shutter release button---.
In the drawings, add reference character "E" as shown on the attached page.

Signed and Sealed this

Twenty-ninth Day of September, 1992

Attest:

DOUGLAS B. COMER

*Attesting Officer*    *Acting Commissioner of Patents and Trademarks*